United States Patent
Jackson

(10) Patent No.: US 10,215,297 B2
(45) Date of Patent: Feb. 26, 2019

(54) CONTROL REGULATOR DIAPHRAGM ASSEMBLY WITH INTEGRATED PRESSURE RELIEF

(71) Applicant: FISHER CONTROLS INTERNATIONAL LLC, Marshalltown, IA (US)

(72) Inventor: Trenton F. Jackson, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 249 days.

(21) Appl. No.: 15/001,993

(22) Filed: Jan. 20, 2016

(65) Prior Publication Data

US 2017/0204987 A1 Jul. 20, 2017

(51) Int. Cl.
*F16K 17/16* (2006.01)
*F16K 31/126* (2006.01)
*F16K 17/40* (2006.01)

(52) U.S. Cl.
CPC ........ *F16K 17/1626* (2013.01); *F16K 17/162* (2013.01); *F16K 17/1606* (2013.01); *F16K 17/403* (2013.01); *F16K 31/1262* (2013.01); *Y10T 137/1692* (2015.04); *Y10T 137/1699* (2015.04); *Y10T 137/1707* (2015.04); *Y10T 137/1714* (2015.04); *Y10T 137/1722* (2015.04); *Y10T 137/1729* (2015.04); *Y10T 137/1737* (2015.04); *Y10T 137/1752* (2015.04)

(58) Field of Classification Search
CPC .... F16K 17/16; F16K 17/162; F16K 17/1606; F16K 17/403; F16K 31/1262; F16K 31/1626; Y10T 137/1714; Y10T 137/1692; Y10T 137/1744; Y10T 137/1729; Y10T 137/1737; Y10T 137/1752; Y10T 137/1707; Y10T 137/1699; Y10T 137/1722
See application file for complete search history.

(56) References Cited

U.S. PATENT DOCUMENTS

| | | | |
|---|---|---|---|
| 1,489,349 A | 4/1924 | Hampton | |
| 2,766,904 A | 10/1956 | Bruce | |
| 2,775,983 A * | 1/1957 | Johnson | F16J 3/02 92/103 F |
| 3,092,070 A | 6/1963 | Wright | |

(Continued)

FOREIGN PATENT DOCUMENTS

| | | |
|---|---|---|
| GB | 844393 A | 8/1960 |
| WO | WO-2009073486 A1 | 6/2009 |
| WO | WO-2010/067182 A1 | 6/2010 |

OTHER PUBLICATIONS

Search Report for International application No. PCT/US2017/014283, dated Apr. 6, 2017.

(Continued)

*Primary Examiner* — Atif Chaudry
(74) *Attorney, Agent, or Firm* — Marshall, Gerstein & Borun LLP

(57) ABSTRACT

A control regulator includes a diaphragm assembly with an integrated pressure relief mechanism. The diaphragm assembly includes a diaphragm with a locally weakened area and a diaphragm plate with an opening aligned with the locally weakened area.

18 Claims, 5 Drawing Sheets

(56) References Cited

U.S. PATENT DOCUMENTS

| | | | | |
|---|---|---|---|---|
| 3,445,032 | A * | 5/1969 | Hansen | F16K 17/162 |
| | | | | 137/68.25 |
| 4,301,938 | A * | 11/1981 | Wood | F16K 17/1626 |
| | | | | 137/68.24 |
| 4,498,261 | A * | 2/1985 | Wilson | B65D 90/36 |
| | | | | 220/89.2 |
| 5,058,413 | A * | 10/1991 | Muddiman | F16K 17/1606 |
| | | | | 219/121.7 |
| 5,154,202 | A | 10/1992 | Hibler, Jr. et al. | |
| 5,377,716 | A | 1/1995 | Farwell et al. | |
| 6,607,003 | B1 * | 8/2003 | Wilson | F16K 17/16 |
| | | | | 137/68.23 |
| 2013/0312840 | A1 * | 11/2013 | Young | F16K 31/1221 |
| | | | | 137/15.19 |
| 2014/0138564 | A1 * | 5/2014 | Adams | F15B 15/10 |
| | | | | 251/63.6 |

OTHER PUBLICATIONS

Written Opinion for International application No. PCT/US2017/014283, dated Apr. 6, 2017.

* cited by examiner

US 10,215,297 B2

CONTROL REGULATOR DIAPHRAGM ASSEMBLY WITH INTEGRATED PRESSURE RELIEF

FIELD OF THE DISCLOSURE

The present disclosure relates generally to control regulators for fluid process systems and, more particularly, to control regulators including diaphragm assemblies having an integrated pressure relief mechanism.

BACKGROUND

Process plants, such as refineries, chemical plants or pulp and paper plants, consist of numerous process control loops connected together to produce various products. Each of these process control loops is designed to keep some process variable such as pressure, flow, level, or temperature, within a required operating range to ensure the quality of the end product. Control valves or control regulators within the system manipulate a flowing fluid, such as gas, steam, water, or a chemical compound, to compensate for load disturbances and to maintain regulated process variables as close as possible to a desired control or a set point.

Various control valve configurations may be applicable for certain applications. For example, when a quick-opening valve with a narrow control range is suitable, a rotary control valve, such as a butterfly valve, may be used. Alternatively, when precise control over a large control range is required, a sliding stem control valve may be used. In any configuration, such control valves are generally coupled to a control device such as an actuator, which controls the exact opening amount of the control valve in response to a control signal.

In some systems, especially in pneumatically controlled fluid process systems, the actuator for any given fluid process control device may include a diaphragm actuator. Typical diaphragm actuators comprise a housing containing a spring-biased diaphragm assembly. The diaphragm assembly is operatively coupled via a stem, or other actuator rod, to a valve plug, or other control member, to control the opening amount of the fluid process control device.

Some assemblies include a diaphragm and one or more diaphragm plates. The diaphragm includes a flexible disk-shaped member. The plate or plates are disposed adjacent to the diaphragm and are adapted to be engaged by one or more springs disposed within the housing. Additionally, the plates provide a rigid mechanical connection to the stem. The springs serve to bias the diaphragm assembly into a predetermined position such that the actuator may bias the control device into an open or closed configuration. In some devices, the diaphragm plate includes a dished portion, against which the diaphragm is sealed with a standard worm gear hose-clamp. In other devices, the diaphragm is not fixed to the plate at all. However, the one or more diaphragm plates, as mentioned, are rigidly fixed to the stem of the actuator. Such fixation is generally achieved by threaded attachment. For example, in one form, the stem includes a threaded end portion disposed through a central aperture in the one or more plates. A nut is then threaded onto the threaded end portion of the stem to attach the stem to the plate(s).

When the actuator is exposed to excessive fluid pressure, such as when a supply regulator fails, actuator components are subject to failure, leading to a loss of proper process control and/or to a dangerous situation where high pressure fluid may be sprayed into the environment. To prevent catastrophic failures, some high pressure systems include an external pressure relief valve or a rupture disc to relieve pressure when the pressure exceeds a maximum set point. However, these external pressure relief valves and/or rupture discs add additional costs to the system and are often not used due to the additional costs.

DETAILED DESCRIPTION

Figure 1:
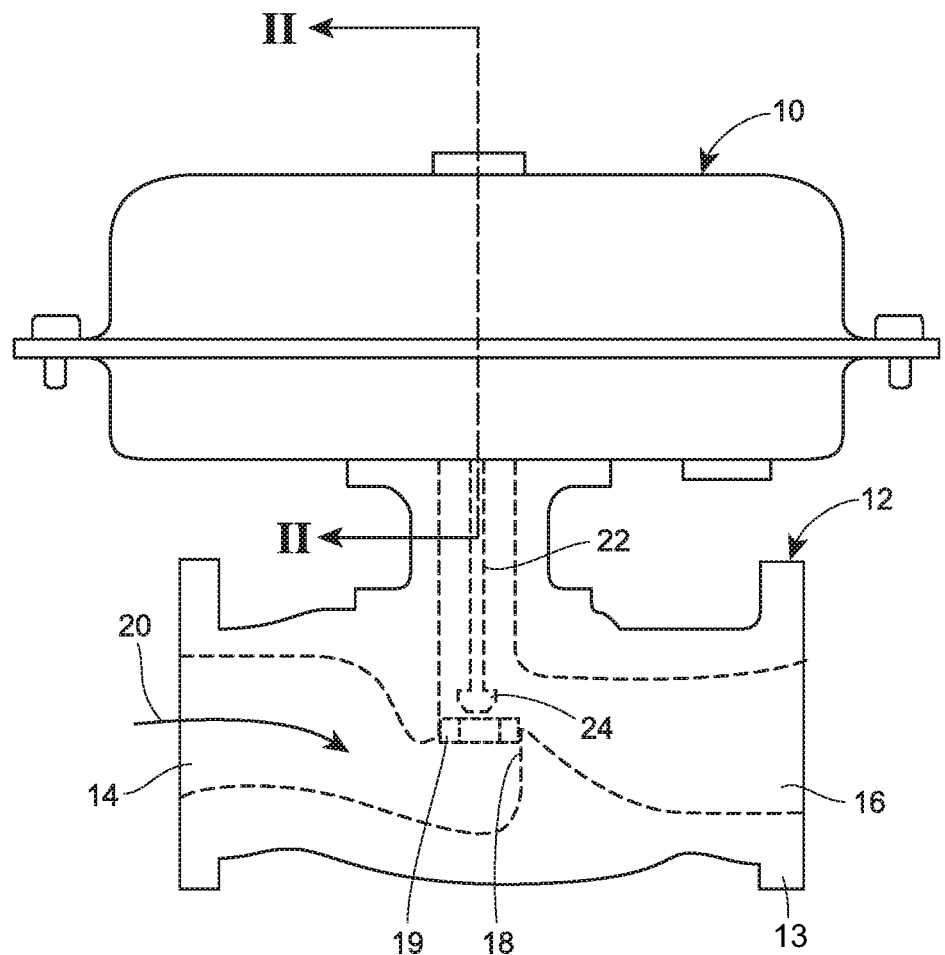
FIG. 1 is a side view of a control regulator constructed in accordance with the principles of the present invention.

Referring not to FIG. 1, an actuator 10 that constructed in accordance with the principles of the present invention is illustrated. The actuator 10 is connected to a fluid process control device, such as a control regulator 12. The control regulator 12 may include a valve body 13 defining a fluid inlet 14, a fluid outlet 16, a throat 18, and a fluid flow-path 20. The fluid flow-path 20 is disposed between the fluid inlet 14 and the fluid outlet 16. The control regulator 12 may be adapted to be disposed within a fluid process control system including, for example, a process plant such as a refinery, or a chemical, pulp, or paper plant. The control regulator 12 controls the flow of a fluid through the system in accordance with one or more operating parameters.

The actuator 10 includes a valve stem 22 connected to a valve plug 24, which slides within the throat 18 of the control regulator 12. During operation, the actuator 12 moves the valve stem 22, and therefore the valve plug 24, relative to a valve seat 19 disposed within the throat 18 of the control regulator 12. A position of the valve plug 24 relative to the valve seat 19 controls a quantity of fluid traveling through the fluid flow-path 20, as may be desired for any given process application.

Figure 2:
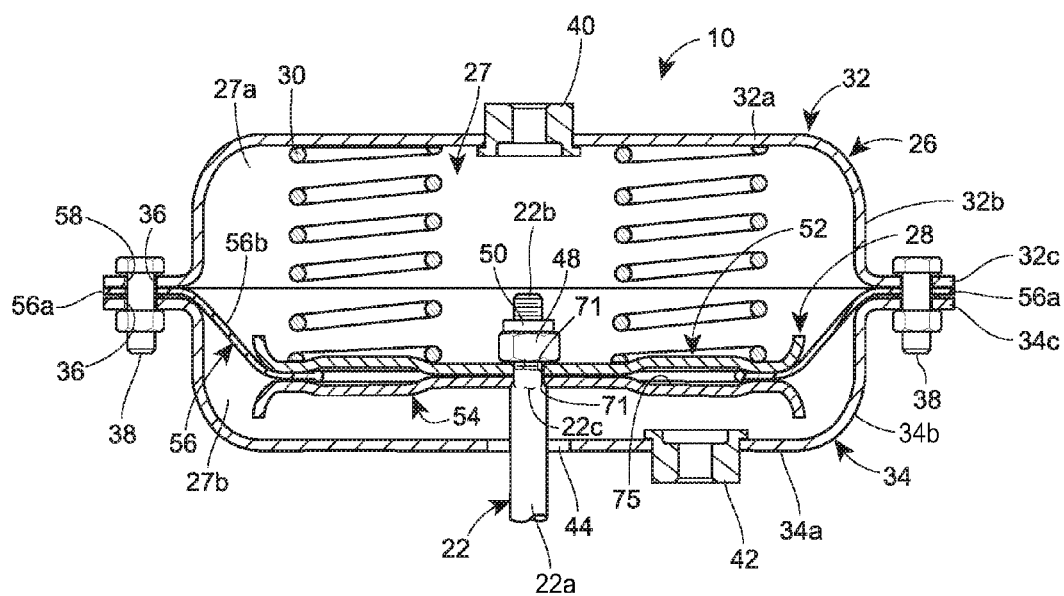
FIG. 2 is a cross-sectional side view of the actuator of FIG. 1 taken through line II-II of FIG. 1.

With reference now to FIG. 2, one embodiment of the actuator 10 is illustrated. The actuator 10 includes a housing 26, a diaphragm assembly 28, and a plurality of springs 30. The housing 26 defines an internal cavity 27. The diaphragm assembly 28 is disposed within the housing 26 and divides the internal cavity 27 into an upper cavity 27a and a lower cavity 27b. The diaphragm assembly 28 provides a fluid-tight seal between the upper and lower cavities 27a, 27b. The springs 30 bias the diaphragm assembly 28 towards the valve seat 19, which is downward relative to the orientation of the actuator 10 illustrated in FIG. 2. This downward bias urges the valve plug 24 (shown in FIG. 1) towards the valve seat 19 to close the flow of fluid through the flow path 20, thereby defining a biased-closed actuator 10. In other control regulators, the spring bias may be reversed, resulting in a biased-open actuator. Regardless, a fluid pressure may be introduced into the lower cavity 27b of the housing 26 to force the diaphragm assembly 28 upward against the bias of the springs 30, thereby lifting the valve plug 24 away from the valve seat 19 to open the flow path 20 of the control regulator 12.

The housing 26 of the actuator 10 may include an upper housing component 32 and a lower housing component 34. Each housing component 32, 34 may include a plate portion 32a, 34a, a wall 32b, 34b, and a flange 32c, 34c. In one embodiment, the plate portions 32a, 34a may be generally circular. Therefore, the walls 32b, 34b and the flanges 32c, 34c extend circumferentially about the plate portions 32a, 34a. The radial flanges 32c, 34c define a plurality of apertures 36 for receiving fasteners 38 to secure the upper housing component 32 to the lower housing component 34, as illustrated in FIG. 2. In the disclosed embodiment, the fasteners 38 each comprise a hexagonal nut in threaded engagement with a hexagonal bolt. In other embodiments, other attachment means may be used, such as rivets, welds, adhesives, or any other suitable means of attaching the upper housing component 32 to the lower housing component.

The upper housing component 32 may define a fluid port 40 and the lower housing component 34 may define a fluid port 42. The fluid ports 40, 42 are adapted to be coupled to respective fluid supply lines, such as pneumatic supply lines, for varying the pressure within the upper and lower cavities 27a, 27b of the housing 26. Further still, the lower housing component 34 defines an opening 44 for accommodating the stem 22. In other embodiments, one or both of the fluid ports 40, 42 may be removed so that one or both of the upper cavity 27a and the lower cavity 28b may be closed or sealed.

The valve stem 22 operatively couples the diaphragm assembly 28 to the valve plug 24. The valve stem 22 generally includes an elongated rod having a body portion 22a, a threaded end portion 22b, and a shoulder 22c. The body portion 22a includes a diameter that is larger than a diameter of the threaded end portion 22b. The shoulder 22c is disposed between the body portion 22a and the threaded end portion 22b.

The threaded end portion 22b of the valve stem 22 may be coupled to the diaphragm assembly 28 with a nut 48. The nut 48 may be secured to the valve stem 22 with a retaining nut 50. The retaining nut 50 may be threaded onto the threaded end portion 22b of the valve stem 22 and into engagement with the nut 48 to prevent the nut 48 from loosening and backing off of the valve stem 22. The diaphragm assembly 28 may also apply a force to the nut 48, thereby preventing the nut 48 from loosening and backing off of the stem 22.

In the embodiment illustrated in FIG. 2, the diaphragm assembly 28 may include a pair of diaphragm plates 52, 54 and a diaphragm 56. The diaphragm 56 may be constructed of a flexible material that may include a fabric layer and two polymer layers, as further discussed below. In other embodiments, the diaphragm 56 may include composite materials and/or any other suitable material capable of providing a fluid tight seal. In this embodiment, the diaphragm 56 includes an outer radial portion 56a and an inner radial portion 56b. The outer radial portion 56a defines a plurality of apertures 58 for receiving the fasteners 38 that secure the radial flange portions 32c, 34c of the upper and lower housing components 32, 34 together. So configured, the radial flange portions 32c, 34c compress the outer radial portion 56a of the diaphragm 56. Central apertures 71 of the diaphragm plates 52, 54 are adapted to receive the valve stem 22 to enable connection of the valve stem 22 to the diaphragm assembly 28.

While the actuator 10 has, thus far, been disclosed as comprising a nut 48 connecting the stem 22 to the diaphragm assembly 28, an alternative embodiment may not require a nut. For example, in one alternative embodiment, the central aperture 71 defined in the upper diaphragm plate 52 may include internal threads. The internal threads of the central aperture 71 may be sized and configured for threaded engagement with the threaded end portion 22b of the stem 22. So configured, the threaded end portion 22b of the valve stem 22 would be disposed in direct threaded engagement with the internal threads of the upper diaphragm plate 52. Tightening the threaded end portion 22b of the valve stem 22 to the upper diaphragm plate 52 would draw the inner radial portions 52b, 54b of the diaphragm plates together, as depicted in FIG. 2, for example. In such an embodiment, it should be appreciated that the retaining nut 50 may be utilized to assist in retaining the valve stem 22 and upper diaphragm plate 52 together, however, the force inherently generated by deforming and compressing the diaphragm plates 52, 54 would generate sufficient friction between the threaded end portion 22b of the valve stem 22 and the central aperture 71 to prevent the valve stem 22 from loosening from the upper diaphragm plate 52.

Figure 3:
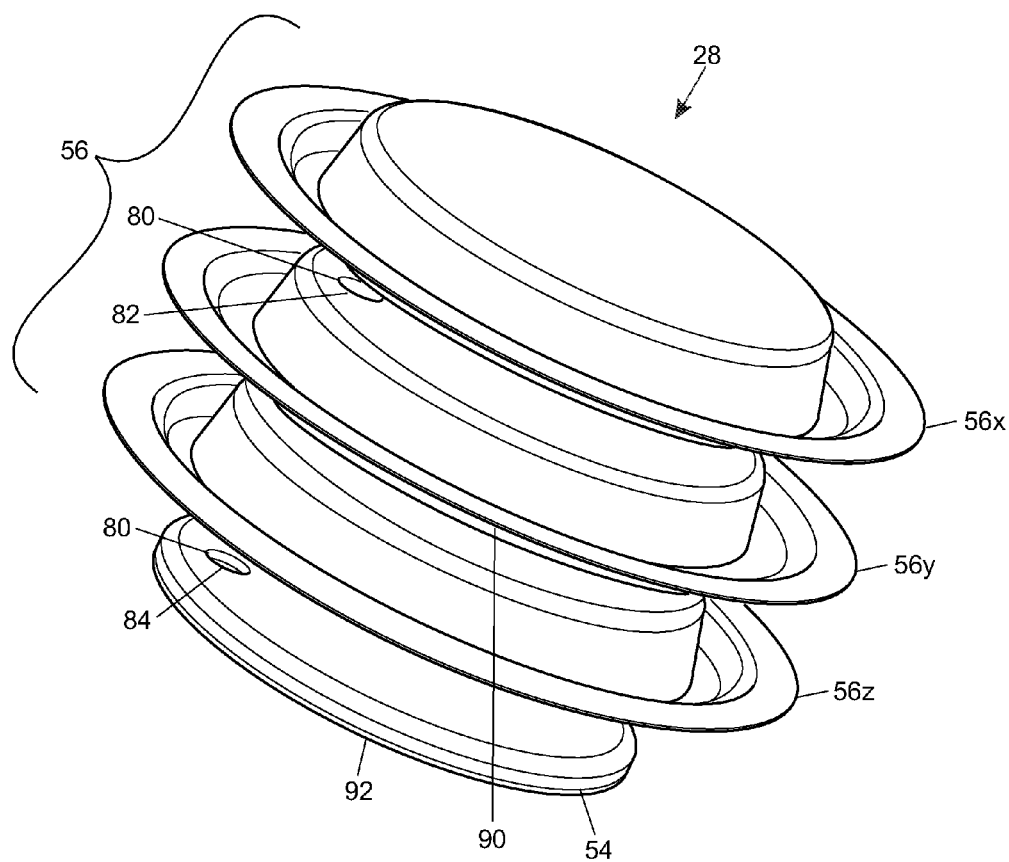
FIG. 3 is an exploded perspective view of the diaphragm assembly of FIG. 2.

Turning now to FIG. 3, one embodiment of a diaphragm assembly 28 is illustrated. The diaphragm assembly 28 includes the diaphragm 56 and the diaphragm plate 54. The diaphragm assembly includes a pressure relief mechanism 80. The diaphragm 56 is made up of three layers, a top layer 56x, a middle layer 56y, and a bottom layer 56z. The top and bottom layers 56x and 56z are made from an elastomer, such as rubber. The middle layer 56y is made from fabric. In other embodiments, the layers 56x, 56y, 56z may be made from other materials known to form diaphragms. The middle layer 56y includes an opening 82. Similarly, the diaphragm plate 54 includes an opening 84. The pressure relief mechanism 80 comprises the opening 82 in the middle layer 56y and the opening 84 in the diaphragm plate 54. In a preferred embodiment, the diaphragm layers 56x, 56y, 56z are formed by molding layers elastomer layers 56x and 56z around fabric layer 56y to form an integral diaphragm 56.

The openings 82, 84 form a locally weakened area on the diaphragm assembly 56. When the openings 82, 84 are aligned with one another, the material of the upper and lower layers 56x, 56z is not supported or reinforced by material in the middle layer 56y. As a result, these areas will fail first (and at a designed pressure limit) when an over pressurization situation occurs. In one embodiment, the locally weakened area will fail at a pressure above normal operating pressure, but below a major component failure pressure. By using the geometry of the openings 82, 84 and the amount of fabric disturbance during an over pressure situation, the system can be designed to fail at a desired pressure. When the locally weakened area fails, the actuator will depressurize, allowing the valve plug to return to its spring fail (or fail safe) position, which can either be opened or closed.

In the embodiment of FIG. 3, the openings 82, 84 are illustrated as being circular. However, in other embodiments, the openings 82, 84 could take on virtually any shape, such as, for example, triangular, square, rectangular, wedge, arc, polygon, etc. Additionally, in some embodiments, the diaphragm 56 may include some sort of alignment feature 90 such as a visual line or molded feature like a cut out or depression, to assist in aligning the opening 82 in the middle layer 56y with the opening 84 in the diaphragm plate 54. Alternatively, an irregular bolt pattern in the casing may be used to ensure correct alignment of the diaphragm 56.

Figure 4:
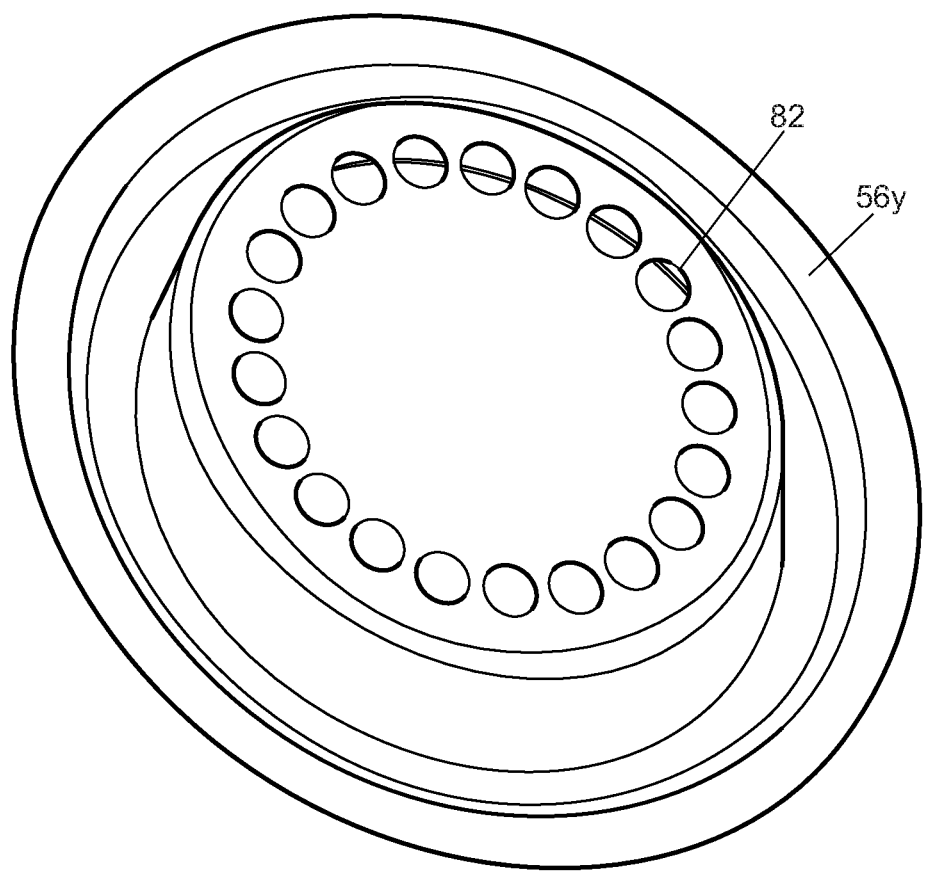
FIG. 4 is a perspective view of an alternate embodiment of a fabric layer of the diaphragm assembly of FIG. 3.

In yet other embodiments, for example as illustrated in FIG. 4, a plurality of openings 82 may be distributed about the middle layer 56y so that at least one opening 82 would be aligned (at least partially) with the opening 84 in the diaphragm plate.

Figure 5:
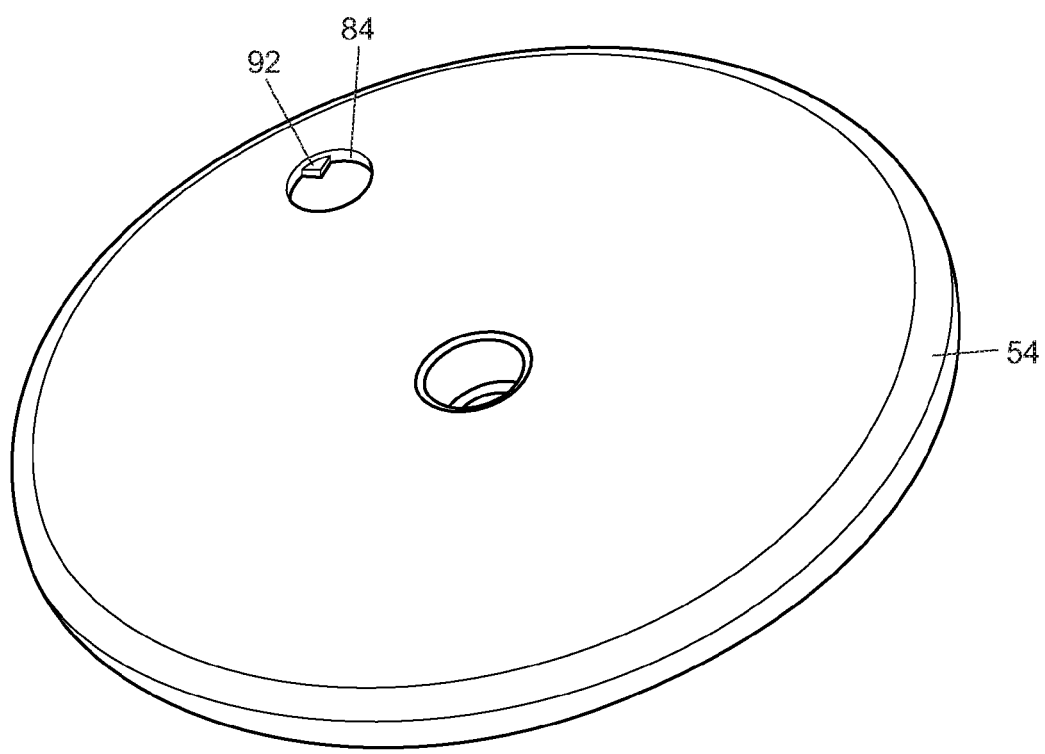
FIG. 5 is a perspective view of an alternative embodiment of a diaphragm plate of the diaphragm assembly of FIG. 3.

In yet other embodiments, for example as illustrated in FIG. 5, the diaphragm plate 54 may include a piercing feature, such as a pointed projection 92, which would pierce the bottom layer 56z and the upper layer 56x when the maximum pressure was reached and the diaphragm 56 was pushed far enough into the opening 84 to contact the piercing feature.

While the embodiment of FIG. 3 illustrates a single diaphragm plate 54 located adjacent to the bottom layer 56z of the diaphragm 56, other embodiments may also include a second diaphragm plate 54 with a similar pressure relief mechanism, such as an opening, that is aligned with the opening 82 in the middle layer 56y. In such an embodiment it is possible to eliminate one of the elastomer layers so that the diaphragm 56 includes only a single elastomer layer 56x and a single fabric layer 56y.

Any of the embodiments of diaphragm assemblies disclosed herein may be used to advantageously provide an integrated pressure relief mechanism to relieve fluid pressure in an over pressure situation, thus preventing damage to internal components.

Although certain diaphragm assemblies have been described herein in accordance with the teachings of the present disclosure, the scope of coverage of this patent is not limited thereto. On the contrary, while the invention has been shown and described in connection with various preferred embodiments, it is apparent that certain changes and modifications, in addition to those mentioned above, may be made. This patent covers all embodiments of the teachings of the disclosure that fairly fall within the scope of permissible equivalents. Accordingly, it is the intention to protect all variations and modifications that may occur to one of ordinary skill in the art.

What is claimed is:

1. A diaphragm for a control regulator, the diaphragm comprising:
   an upper layer comprising an elastomer;
   a middle layer comprising a fabric; and
   a lower layer comprising an elastomer,
   wherein the diaphragm includes a locally weakened area that forms a pressure relief mechanism.

2. The diaphragm of claim 1, wherein the locally weakened area is formed by an opening in the middle layer.

3. The diaphragm of claim 2, wherein the opening is covered by the upper layer and the lower layer.

4. The diaphragm of claim 3, wherein the opening is circular.

5. The diaphragm of claim 2, wherein the locally weakened area is formed by a plurality of openings in the middle layer.

6. The diaphragm of claim 1, further comprising an alignment index.

7. The diaphragm of claim 6, wherein the alignment index is a visual indicium.

8. A diaphragm assembly for a control regulator, the diaphragm assembly comprising:
   a diaphragm including an upper layer, a middle layer, a lower layer, and a locally weakened area that forms a pressure relief mechanism; and
   a diaphragm plate that supports the diaphragm, the diaphragm plate including a piercing feature,
   wherein the locally weakened area is formed by an opening in the middle layer.

9. The diaphragm assembly of claim 8, wherein the diaphragm plate includes an opening that is aligned with the opening in the middle layer.

10. The diaphragm assembly of claim 8, wherein the opening is covered by the upper layer and the lower layer.

11. The diaphragm assembly of claim 10, wherein the opening is circular.

12. The diaphragm assembly of claim 8, wherein the locally weakened area is formed by a plurality of openings in the middle layer.

13. The diaphragm assembly of claim 8, further comprising an alignment index located on the diaphragm.

14. The diaphragm assembly of claim 13, wherein the alignment index is a visual indicium.

15. The diaphragm assembly of claim 13, further comprising an alignment index on the diaphragm plate.

16. A control regulator comprising:
   a valve body forming a fluid inlet and a fluid outlet connected by a fluid passageway;
   a valve plug disposed within the valve body, the valve plug cooperating with a valve seat to control a flow of fluid through the valve body;
   an actuator coupled to the valve body, the actuator including a diaphragm assembly that is operatively connected to the valve plug by a valve stem, the diaphragm assembly including a diaphragm having an upper layer, a middle layer, a lower layer, and a locally weakened area that forms a pressure relief mechanism; and a diaphragm plate that supports the diaphragm,
   wherein the locally weakened area is formed by an opening in the middle layer.

17. The control regulator of claim 16, wherein the diaphragm plate includes an opening that is aligned with the opening in the middle layer.

18. The control regulator of claim 17, further comprising an alignment index located on the diaphragm and an alignment index on the diaphragm plate.

\* \* \* \* \*